United States Patent

Rossi et al.

[11] 4,047,944
[45] Sept. 13, 1977

[54] ELECTROPHORETIC MIGRATION IMAGING PROCESS WITH NEUTRAL DENSITY BISAZO PIGMENTS

[75] Inventors: Louis J. Rossi; Michael T. Regan, both of Rochester, N.Y.

[73] Assignee: Eastman Kodak Company, Rochester, N.Y.

[21] Appl. No.: 755,368

[22] Filed: Dec. 27, 1976

Related U.S. Application Data

[63] Continuation-in-part of Ser. No. 691,266, June 1, 1976, abandoned.

[51] Int. Cl.² ............................................. G03Q 13/22
[52] U.S. Cl. .................................. 96/1.2; 96/1.3; 96/1.5 R; 260/148
[58] Field of Search ................. 96/1 PE, 1.2, 1.3, 1.5, 96/1.6

[56] References Cited

U.S. PATENT DOCUMENTS

| | | | |
|---|---|---|---|
| 3,384,566 | 5/1968 | Clark | 96/1 PE X |
| 3,482,970 | 12/1969 | Solodar et al. | 96/1.5 |
| 3,549,358 | 12/1970 | Clark et al. | 96/1.5 X |
| 3,562,248 | 2/1971 | Jones et al. | 96/1 PE X |
| 3,574,182 | 4/1971 | Jones | 96/1 PE X |
| 3,652,438 | 3/1972 | Jones | 96/1.3 X |
| 3,658,675 | 4/1972 | Jones et al. | 96/1.2 X |
| 3,898,084 | 8/1975 | Champ et al. | 96/1.5 |
| 3,929,760 | 12/1975 | Landholm et al. | 96/1.3 X |
| 3,932,380 | 1/1976 | Krutak et al. | 96/1.6 X |
| 3,933,664 | 1/1976 | Nagashima et al. | 96/1.2 X |

*Primary Examiner*—Roland E. Martin, Jr.
*Attorney, Agent, or Firm*—G. W. Neuner

[57] ABSTRACT

An improved electrophoretic imaging process is provided wherein the improvement comprises the use of electrostatic charge-bearing particles having an electrically photosensitive pigment which is the reaction product of 2,3-naphthalenediol and a diazonium salt. Preferred pigments have the following structure:

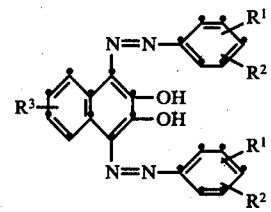

wherein:
$R^1$ is a lower alkoxy group or $-OCH_2CONH_2$;
$R^2$ is H or $NO_2$; and
$R^3$ is H or $-SO_2NH_2$.

7 Claims, 2 Drawing Figures

ELECTROPHORETIC MIGRATION IMAGING PROCESS WITH NEUTRAL DENSITY BISAZO PIGMENTS

This application is a continuation-in-part of application Ser. No. 691,266, filed June 1, 1976 now abandoned.

FIELD OF THE INVENTION

This invention relates to colorant materials, particularly electrically photosensitive neutral density materials comprising certain bis-azo pigments, especially useful in electrophoretic migration imaging processes.

BACKGROUND OF THE INVENTION

In the past there has been extensive description in the patent and other technical literature relating to electrophoretic migration imaging processes and colorants useful therein. For example, a description of such processes and colorants may be found in sugarman, U.S. Pat. No. 2,758,939, issued Aug. 14, 1956; Kaprelian U.S. Pat. No. 2,940,847; 3,100,426; 3,140,175 and 3,143,508; Tulagin et al. U.S. Pat. Nos. 3,384,565; 3,384,488 and 3,615,558; Clark U.S. Pat. No. 3,384,566; and Yeh U.S. Pat. No. 3,383,993. In addition to the foregoing patent literature directed to conventional photoelectrophoretic migration imaging processes another type of electrophoretic migration imaging process which advantageously provides for image reversal is described in Groner U.S. patent application Ser. No. 607,650, filed Aug. 25, 1975.

However, regardless of the particular electrophoretic migration imaging process employed, an essential component of any such process is the electrically photosensitive particles. And, of course, to obtain an easy-to-read, visible image it is important that these electrically photosensitive particles be colored as well as electrically photosensitive. Accordingly, as is apparent from the technical literature regarding electrophoretic migration imaging processes, work has been carried on in the past and is continuing to find colorants which possess useful levels of electrical photosensitivity and which exhibit good colorant properties. Thus, for example, various types of electrically photosensitive materials are disclosed for use in electrophoretic migration imaging processes, for example, in Sugarman U.S. Pat. No. 2,758,939; Kaprelian U.S. Pat. No. 2,940,847, Tulagin et al. U.S. Pat. No. 3,384,488 and U.S. Pat. No. 3,615,558 noted hereinabove.

In large part, the art, to date, has generally selected useful electrically photosensitive or photoconductive pigment materials for electrophoretic migration imaging from known classes of photoconductive materials which may be employed in conventional photoconductive elements, e.g., photoconductive plates, drums, or webs used in electrophotographic office copier devices. For example, both Sugarman and Kaprelian in the above-referenced patents state that electrically photosensitive materials useful in electrophoretic migration imaging processes may be selected from known classes of photoconductive materials. And, the phthalocyanine pigments described as a useful electrically photosensitive material for electrophoretic imaging processes in Tulagin et al. U.S. Pat. No. 3,615,558 have long been known to exhibit useful photoconductive properties.

It is recognized, as set forth above, that many useful electrically photosensitive materials which are employed in electrophoretic migration imaging processes can be and have been selected from known photoconductive materials. However, in accord with the present invention, a class of electrically photosensitive materials has been discovered which is believed to represent a new class of materials. In this regard, it is noted that Jones, Jr. et al. U.S. Pat. No. 3,562,248, issued Feb. 9, 1971, describe certain bisazo pigments derived from couplers obtained by condensing 8-amino-2-napnthols with dicarboxylic acid chlorides and the use of such pigments in electrophoretic imaging systems. These bisazo pigments differ structurally from the pigments of the present invention.

Various other azo compounds that are structurally different from the pigments of the present invention, including azo compounds containing naphthyl groups, and that have been found useful in electrophoretic imaging systems, are described in the following patents: U.S. Pat. Nos. 3,652,438 and 3,852,208; British Pat. Nos. 1,146,142; 1,160,671; 1,340,207 and 1,348,121.

SUMMARY OF THE INVENTION

In accordance with the present invention, it has been found that electrostatic charge-bearing particles that comprise an electrically photosensitive bisazo pigment which is the reaction product of 2,3-naphthalenediol and certain diazonium salts are useful in electrophoretic imaging processes. Such useful bisazo pigments are those having the formula:

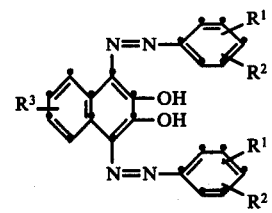

I.

wherein
R$^1$ is —OCH$_3$, —OC$_2$H$_5$ or —OCH$_2$CONH$_2$;
R$^2$ is H or —NO$_2$; and
R$^3$ is H or —SO$_2$NH$_2$.

When used in an electrophoretic process, the bisazo pigments of the present invention can be used alone as a charge-bearing, electrically photosensitive particle or can be incorporated in charge-bearing, electrically photosensitive particles which are positioned between two spaced electrodes, preferably these particles are contained in an electrically insulating carrier such as an electrically insulating liquid or an electrically insulating, liquefiable matrix material, e.g., a thixotropic or a heat and/or solvent-softenable material, which is positioned between the spaced electrodes. While so positioned between the spaced electrodes, the photosensitive particles are subjected to an electric field and exposed to a pattern of activating radiation. As a consequence, the charge-bearing, electrically photosensitive particles undergo a radiation-induced variation in their charge polarity and migrate to one or the other of the electrode surfaces to from on at least one of these electrodes an image pattern representing a positive-sense or negative-sense image of the original radiation exposure pattern.

DESCRIPTION OF THE PREFERRED EMBODIMENTS

Figure 2:
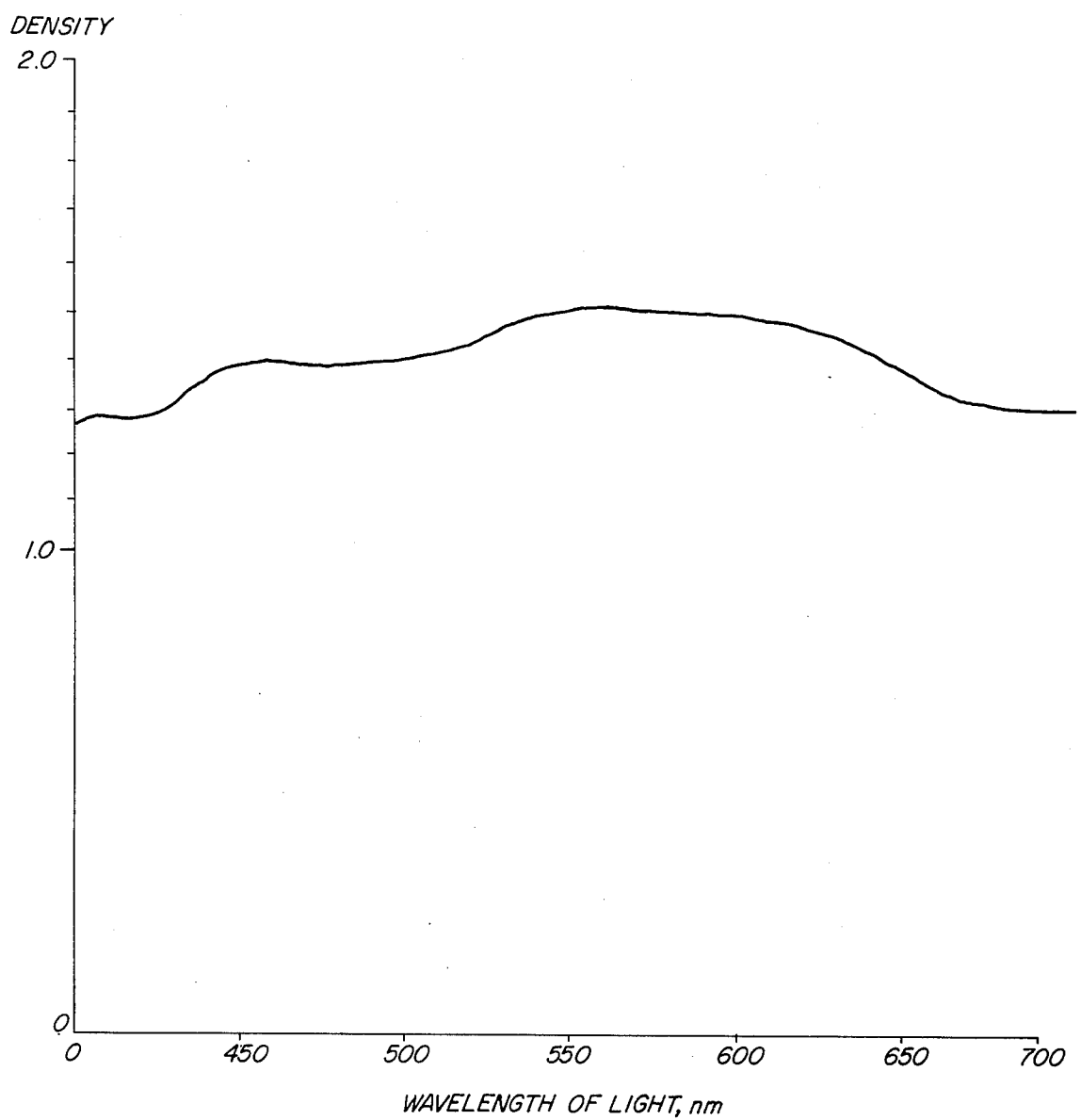
FIG. 2 illustrates a spectral absorption curve for a particularyl useful bisazo dye pigment of the present invention.

In addition to the useful levels of electrical photosensiveity exhibited by the materials of formula I above in electrophoretic migration imaging processes, the materials of formula I generally exhibit certain other properties which make these materials quite useful in electrophoretic migration imaging processes. Among other such useful properties, the materials of formula I typically have a nautral density coloration, generally exhibiting a substantially uniform absorption spectral to radiation in the range of from 400 nm to about 700 nm as illustrated by FIG. 2.

Examples of the bisazo naphthalenediol pigments of Formula I which are useful in the practice of the present invention include:

1,4-bis(p-anisylazo)-2,3-naphthalenediol;
1,4-bis(o-anisylazo)-2,3-naphthalenediol;
1,4-bis(p-ethoxyphenylazo)-2,3-naphthalenediol;
1,4-bis(4-anisylazo)-2,3-dihydroxy-6-naphthalene sulfonamide;
1,4-bis(4-carbamoylmethyoxyphenylazo)-2,3-naphthalenediol;
1,4-bis(2-nitro-4-anisylazo)-2,3-naphthalenediol; and
1,4-bis(5-nitro-2-anisylazo)-2,3-naphthalenediol.

As indicated hereinabove, the electrically photosensitive bisazo pigments described herein can be used in the preparation of electrically photosensitive imaging particles for electrophoretic migration imaging processes. In general, electrically photosensitive particles useful in such processes have an average particle size within the range of from above 0.01 micron to about 20 microns, preferably about 0.01 to about 5 microns. Typically, these particles are composed of one or more colorant materials such as those described in the present invention. However, these electrically photosensitive particles may also contain various non-photosensitive materials such as electrically insulating polymers, charge control agents, various organic and inorganic fillers, as well as various additional dyes or pigment materials to change or enhance various colorant and physical properties of the electrically photosensitive particle. In addition, such electrically photosensitive particles may contain other photosensitive materials such as various sensitizing dyes and/or chemical sensitizers to alter or enhance their response characteristics to activating radiation.

When used in an electrophoretic migration imaging process, the electrically photosensitive material described herein as shown in Formula I hereinabove is typically positioned, in particulate form, between two or more spaced electrodes, one or both of which typically being transparent to radiation to which the electrically photosensitive material is light sensitive, i.e., activating radiation. Although the electrically photosensitive material, in particulate form, may be dispersed simply as a dry powder between two spaced electrodes and then subjected to a typical electrophoretic migration imaging operation such as that described in Sugarman U.S. Pat. No. 2,758,939 referenced hereinabove, it is more typical to disperse the electrically photosensitive particulate material in an electrically insulating carrier, such as an electrically insulating liquid, or an electrically insulating, liquefiable matrix material, such as a heat and/or solvent softenable polymeric material or a thixotropic material. Typically, when one employs such a dispersion of electrically photosensitive particulate material and electrically insulating carrier material between the spaced electrodes of an electrophoretic migration imaging system, it is conventional to employ from about 0.05 parts to about 2.0 parts of electrically photosensitive particulate material for each 10 parts by weight of electrically insulating carrier material.

As indicated above, when the electrically photosensitive particles used in the present invention are dispersed in an electrically insulating carrier material, such carrier material may assume a variety of physical forms and may be selected from the variety of different materials. For example, the carrier material may be a matrix of an electrically insulating, normally solid polid polymeric material capable of being softened or liquefied upon application of heat, solvent and/or pressure so that the electrically photosensitive particulate material dispersed therein can migrate through the matrix. In another, more typical embodiment of the invention, the carrier material can comprise an electrically insulating liquid such as decane, paraffin, Sohio Oderless Solvent 3440 (a kerosene fraction marketed by the Standard Oil Company, Ohio), various isoparaffinic hydrocarbon liquids such as those sold under the trademark Isopar G by Exxon Corporation and having a boiling point in the range of 145° C to 186° C, various halogenated hydrocarbons such as carbon tetrachloride, trichloromonofluoromethane, and the like, various alkylated aromatic hydrocarbon liquids such as the alkylated benzenes, for example, xylenes, and other alkylated aromatic hydrocarbons such as are described in U.S. Pat. No. 2,899,335. An example of one such alkylated aromatic hydrocarbon liquid which is commercially available is Solvesso 100 made by Exxon Corp. Solvesso 100 has a boiling point in the range of about 157° C to about 177° C and is composed of 9% xylene, 16% of other monoalkyl benzenes, 34% dialkyl benzenes, 37% trialkyl benzenes and 4% aliphatics. Typically, whether solid or liquid at normal room temperatures, i.e., 22° C, the electrically insulating carrier material used in the present invention is a material having a resistivity greater than about $10^9$ ohm-cms, preferably greater than $10^{12}$ ohm-cm. When the electrically photosensitive particles used in the present invention are incorporated in a carrier material, such as one of the above-described electrically insulating liquids, various other addenda may also be incorporated in the resulant imaging suspension. For example, various charge control agents may be incorporated in such a suspension to improve the uniformity of charge polarity of the electrically photosensitive particles dispersed in the liquid suspension. Such charge control agents are well known in the field of liquid electrographic developer compositions where they are employed for purposes substantially similar to that described herein. Thus, extensive discussion of these materials herein is deemed unnecessary. These materials are typically polymeric materials incorporated by admixture thereto into the liquid carrier vehicle of the suspension. In addition to, and possibly related to, the aforementioned enhancement of uniform charge polarity, it has been that the charge control agents often provide more stable suspensions, i.e., suspensions which exhibit substantially less settling out of the dispersed photosensitive particles.

In addition to the foregoing charge control agent materials, various polymeric binder materials such as various natural, semi-synthetic or synthetic resins, may be dispersed or dissolved in the electrically insulating carrier to serve as a fixing material for the final photosensitive particle image formed on one of the spaced electrodes used in electrophoretic migration imaging systems. Here again, the use of such fixing addenda is conventional and well known in the closely related art of liquid electrographic developer compositions so that extended discussion thereof is unnecessary herein.

The utility of the colorants of the present invention will be described in more detail, with reference to the accompanying drawing, FIG. 1, which illustrates an apparatus which carries out an electrophoretic migration imaging process.

Figure 1:
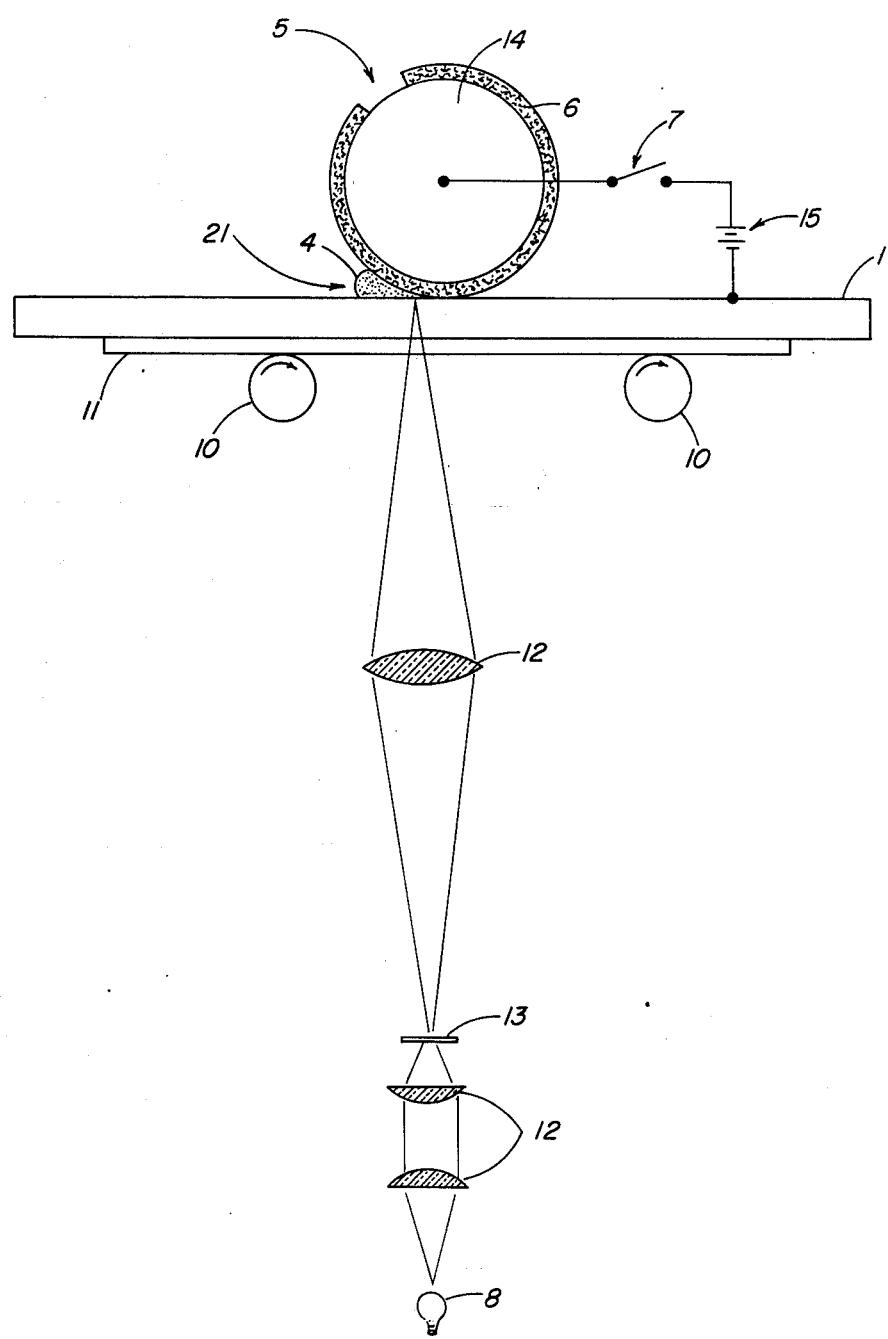
FIG. 1 represents diagrammatically a typical imaging apparatus for carrying out an electrophoretic migration imaging process using the colorant materials of the invention.

FIG. 1 shows a transparent electrode 1 supported by two rubber drive rollers 10 capable of imparting a translating motion to electrode 1 in the direction of the arrow. Electrode 1 may be composed of a layer of optically transparent material, such as glass or an electrically insulating, transparent polymeric support such as polyethylene terephthalate, covered with a thin, optically transparent, conductive layer such as tin oxide, nickel and the like. Optionally, depending upon the particular type of electrophoretic migration imaging process desired, the surface of electrode 1 may bear a "dark charge exchange" material, such as a solid solution of an electrically insulating polymer and 2,4,7-trinitro-9-fluorenone as described in Groner U.S. patent application Ser. No. 607,650, filed Aug. 25, 1975.

Spaced opposite electrode 1 and in pressure contact therewith is a second electrode 5, an idler roller which serves as a counter electrode to electrode 1 for producing the electric field used in the electrophoretic migration imaging process. Typically, electrode 5 has on the surface thereof a thin, electrically insulating layer 6. Electrode 5 is connected to one side of the power source 15 by switch 7. The opposite side of the power source 15 is connected to electrode 1 so that as an exposure takes place, switch 7 is closed and an electric field is applied to the electrically photosensitibe particulate material 4 which is positioned between electrodes 1 and 5. Typically electrically photosensitive particulate material 4 is dispersed in an electrically insulating carrier material such as described hereinabove.

The electrically photosensitive particulate material 4 may be positioned between electrodes 1 and 5 by applying material 4 to either or both of the surfaces of electrodes 1 and 5 prior to the imaging process or by injecting electrically photosensitive imaging material 4 between electrodes 1 and 5 during the electrophoretic migration imaging process.

As shown in FIG. 1, exposure of electrically photosensitive particulate material 4 takes place by use of an exposure system consisting of light source 8, original image 11 to be reproduced, such as a photographic transparency, a lens system 12 and any necessary or desirable radiation filters 13, such as color filters, whereby electrically photosensitive material 4 is irradiated with a pattern of activating radiation corresponding to original image 11. Although the electrophoretic migration imaging system represented in FIG. 1 shows electrode 1 to be transparent to activating radiation from light source 8, it is possible to irradiate electrically photosensitive particulate material 4 in the nip 21 between electrodes 1 and 5 without either of electrodes 1 or 5 being transparent. In such a system, although not shown in FIG. 1, the exposure source 8 and lens system 12 is arranged so that image material 4 is exposed in the nip or gap 21 between electrodes 1 and 5.

As shown in FIG. 1, electrode 5 is a roller electrode having a conductive core 14 connected to power source 15. The core is in turn covered with a layer of insulating material 6, for example, baryta paper. Insulating material 6 serves to prevent or at least substantially reduce the capability of electrically photosensitive particulate material 4 to undergo a radiation induced charge alteration upon interaction with electrode 5. Hence, the term "blocking electrode" may be used, as is conventional in the art of electrophoretic migration imaging, to refer to electrode 5.

Although electrode 5 is shown as a roller electrode and electrode 1 is shown as essentially a translatable, flat plate electrode in FIG. 1, either or both of these electrodes may assume a variety of different shapes such as a web electrode, rotating drum electrode, plate electrode and the like as is well known in the field of electrophoretic migration imaging. In general, during a typical electrophoretic migration imaging process wherein electrically photosensitive material 4 is dispersed in an electrically insulating, liquid carrier, electrodes 1 and 5 are spaced such that they are pressure contact or vary close to one another during the electrophoretic migration imaging process, e.g., less than 50 microns apart. However, where electrically photosensitive particulate material 4 is dispersed simply in an air gap between electrodes 1 and 5 or in a carrier such as a layer of heat-softenable or other liquefiable material coated as a separate layer on electrode 1 and/or 5, these electrodes may be spaced more than 50 microns apart during the imaging process.

The strength of the electric field imposed between electrodes 1 and 5 during an electrophoretic migration imaging process may vary consideraby; however, it has generally been found that optimum image density and resolution are obtained by increasing the field strength to as high a level as possible without causing electrical breakdown of the carrier medium in the electrode gap. For example, when electrically insulating liquids such as isoparaffinic hydrocarbons are used as the carrier in the imaging apparatus of FIG. 1, the applied voltage across electrodes 1 and 5 typically is within the range of from about 100 volts to about 4 kilovolts or higher.

As explained hereinabove, image formation occurs in electrophoretic migration imaging processes as the result of the combined action of activating radiation and electric field on the electrically photosensitive particulate material 4 disposed between electrodes 1 and 5 in the attached drawing. Typically, for best results, field application and exposure to activating radiation occur concurrently. However, as would be expected, by appropriate selection of various process parameters such as field strength, activating radiation intensity, incorporation of suitable light sensitive addenda in or together with the electrically photosensitive material of Formula I used in the present invention, e.g., by incorporation of a persistent photoconductive material, and the like, it is possible to alter the timing of the exposure and field application events so that one may use sequential exposure and field application events rather than concurrent field application and exposure events.

When disposed between imaging electrodes 1 and 5 of FIG. 1, electrically photosensitive particulate material 4 exhibits an electrostatic charge polarity, either as a result of triboelectric interaction of the particles or as a result of the particles interacting with the carrier material in which they are dispersed, for example, an electrically insulating liquid, such as occurs in conventional liquid electrographic developing compositions composed of toner particles which acquire a charge upon being dispersed in an electrically insulating carrier liquid.

Image discrimination occurs in the electrophoretic migrating imaging process of FIG. 1 as a result of the combined application of electric field and activating radiation on the electrically photosensitive particulate material dispersed between electrodes 1 and 5 of the apparatus shown in FIG. 1. That is, in a typical imaging operation, upon application of an electric field between electrodes 1 and 5, the particles 4 of charge-bearing, electrically photosensitive material are attracted in the dark to either electrode 1 or 5, depending upon which of these electrodes has a polarity acquired by the electrically photosensitive particles. And, upon exposing particles 4 to activating electromagnetic radiation, it is theorized that there occurs neutralization or reversal of the charge polarity associated with either the exposed or unexposed particles. In typical electrophoretic migration imaging systems wherein electrode 1 bears a conductive surface, the exposed, electrically photosensitive particles 4, upon coming into electrical contact (not necessarily physical contact) with such conductive surface, undergo an alteration (usually a reversal) of their original charge polarity as a result of the combined application of electric field and activating radiation. Alternatively, in the case wherein the surface of electrode 1 bears a dark charge exchange material as described in Groner U.S. Pat. application Ser. No. 607,650, filed Aug. 25, 1975, one obtains reversal of the charge polarity of the unexposed particles, while maintaining the original charge polarity of the exposed electrically photosensitive particles, as these particles come into electrical contact with the dark charge exchange surface of electrode 1. In any case, upon the application of electric field and activating radiation to electrically photosensitive particulate material 4 disposed between electrodes 1 and 5 of the apparatus shown in FIG. 1, one can effectively obtain image discrimination so that an image pattern is formed by the electrically photosensitive particles which corresponds to the original pattern of activating radiation. Typically, using the apparatus shown in FIG. 1, one obtains a visible image on the surface of electrode 1 and a complementary image pattern on the surface of electrode 5.

Subsequent to the application of the electric field and exposure to activating radiation, the images which are formed on the surface of electrodes 1 and/or 5 of the apparatus shown in FIG. 1 may be temporarily or permanently fixed to these electrodes or may be transferred to a final image receiving element. Fixing of the final particle image can be effected by various techniques, for example, by applying a resinous coating over the surface of the image bearing substrate. For example, if electrically photosensitive particles 4 are dispersed in a liquid carrier between electrodes 1 and 5, one may fix the image or images formed on the surface of electrodes 1 and/or 5 by incorporating a polymeric binder material in the carrier liquid. Many such binders (which are well known for use in liquid electrophotographic liquid developers) are known to acquire a charge polarity upon being admixed in a carrier liquid and therefore will, themselves, electrophoretically migrate to the surface of one or the other of the electrodes. Alternatively, a coating of a resinous binder (which has been admixed in the carrier liquid) may be formed on the surfaces of electrodes 1 and/or 5 upon evaporation of the liquid carrier.

The electrically photosensitive colorant material used in the present invention may be used to form monochrome images, or the material may be admixed with other electrically photosensitive material of proper color and photosensitivity and used to form polychrome images. As indicated, many of the electrically photosensitive colorant materials having Formula I described herein have an especially useful neutral density coloration and therefore are particularly suited for enhancing the colored images in polychrome imaging processes which employ a mixture of two or more differently colored electrically photosensitive particles, e.g., a mixture of cyan particles which are principally sensitive to red light, magenta particles which are principally sensitive to green light, yellow or orange particles which are princiapply sensitive to blue light, and black or neutral density colored particles containing the electrically photosensitive pigments of the present invention which are sensitive to white light. When such a mixture of multicolored electrically photosensitive particles is formed, for example, in an electrically insulating carrier liquid, this liquid mixture of particulate material exhibits a black coloration. Preferably, the specific cyan, magenta and yellow particles selected for use in such a polychrome imaging process are chosen so that their spectral response curves do not appreciably overlap whereby color separation and subtractivemulticolor image reproduction can be achieved.

The following examples illustrate the invention, the parts and percentages being by weight unless otherwise stated.

In the following examples, the compounds of Formula I of the present invention were prepared by coupling diazonium salts with 2,3-naphthalenediol derivatives according to the following reaction:

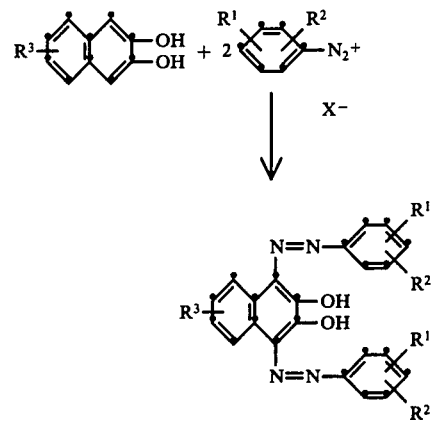

wherein X— is an anion and the R's are as defined in Formula I.

The following detailed example is illustrative of the procedure for preparing the compounds of this invention.

EXAMPLE 1

Preparation of 1,4-Bis(p-anisylazo)- 2,3-naphthalenediol

To a stirred solution of 24.6 g (0.200 mole of p-anisidine, 50 ml (0.60 mole) of concentrated hydrochloric acid and 100 ml of water was added dropwise at 0–5° a solution of 13.8 g (0.200 mole) of sodium nitrite in 30 ml of water. The diazonium salt solution was stirred for 10 minutes after the final addition, then was added dropwise to a solution of 15.9 g (0.0944 mole) of 2,3-naphthalenediol, 110 ml of 28% aqueous ammonia and 350 ml of pyridine at 5° -10°. The mixture was stirred for 1-½ hours after completion of the addition. The solid was collected, washed with methanol, then water and dried to give 26.7 of crude product m.p. 245-251. Recrystallization from pyridine gave 20.7 g (48.5%) of dark solid, m.p. 258° -260°.

Image Evaluation

In each of the succeeding examples, a dispersion comprising a bisazo pigment was tested for image forming capability in two modes of electrophoretic imaging. Tests were conducted in a conventional electrophoretic imaging operation such as described in Sugarman U.S. Pat. No. 2,758,939 called the PEP mode hereafter, and also in the mode described by Groner in U.S. Pat. application Ser. No. 607,650, filed Aug. 25,1975 called the PIER mode hereafter.

The image evaluation apparatus used to carry out the electrophoretic imaging process to test the image forming capability of photosensitive particles that comprise the bisazo pigments describedherein was a device of the type illustrated in FIG. 1. In this apparatus, a translating electrode 1 is made of a NESA (a trademark of Pittsburg Plate Glass for a conductive, transparent, tin oxide-coated glass) glass plate — used in Examples 2-6, PEP mode; a sheet of transparent polyethylene terephthalate having on it a conductive coating of 1.1 OD cermet (Cr SiO)—used in examples 7-10, PEP mode; or a sheet of transparent polyethylene terephthalate having on it a 0.4 OD nickel conductive layer, subbed with estane and overcoated with a 0.6 micrometer layer of 38% 2,4,5-trinitro-9-fluorenone and 62% polycarbonate—used in examples 2-10, PIER mode. Electrode 1 was in pressure contact with electrode 5 which consisted of a 10 cm diameter, resilient polymer coated aluminum roller 14 covered with an insulating layer made of a conductive paper support coated with poly(vinyl butyral).

Electrode 1 was supported by two 2.8 cm diameter rubber drive rollers 10 positioned beneath electrode 1 such that a 2.5 cm opening, symmetric with the axis of aluminum roller 14, existed to allow exposure of electrically photosensitive particles 4 to activating radiation. The original transparency 11 to be reproduced was taped to the back side of electrode 1. The exposing activating radiation was supplied from a light source 8 consisting of a Kodak Carousel projector having a maximum exposure intensity of 3500 footcandles at the electrode 1 exposure plane. The voltage between electrode 5 and electrode 1 was 3/1 2kV in the PEP mode and −4kV in the PIER mode. The translational speed of electrode 1 was 25 cm/sec in the PEP mode and 2.5 cm/sec in the PIER mode.

In the following examples, image formation occurs on the surfaces of electrode 1 and electrode 5 after simultaneous application of light exposure and electric field to electrically photosensitive particulate material 4. In this image evaluation apparatus, each different type of material to be evaluated for use as electrically photosensitive particulate material 4 was admixed with a liquid carrier as described below to form a liquid imaging dispersion which was placed in nip 21 between the electrodes 1 and 5. If the material being evaluated for use as material 4 possessed a useful level of electrical photosensitivity, one obtained an reproduction of original 11 on electrode 5 and a complementary image on electrode 1.

Imaging Dispersion Preparation

In the following examples a series of 18 different imaging dispersions were prepared to evaluate the electrophoretic migration image forming capability of the pigments of the present invention in both the PEP and the PIER mode. The dispersions were prepared by milling the ingredients on a paint shaker for 3 hours with 12 g of 440 stainless steel balls.

| PEP Dispersion Ingredients: | |
|---|---|
| *Isopar®G | 2.2 g |
| Solvesso | 1.3 g |
| Piccotex 100 | 1.4 g |
| Poly(vinyl toluene-co-lauryl methacrylate-co-lithium methacrylate-co-methacrylic acid) 56/40/3.6/0.4 | 0.1 g |
| Pigment | 0.045 g |
| PIER Dispersion Ingredients: | |
| *Isopar®G | 2.5 g |
| Piccotex 100 | 2.5 g |
| Pigment | 0.045 g |

*Isopar®G is an isoparaffinic aliphatic hydrocarbon liquid sold by Exxon Corp. Solvesso is a hydrocarbon liquid sold by Exxon Corp. Piccotex 100 is a styrene-toluene copolymer sold by Pennsylvania Industrial Chemical Corp.

The resulting imaging dispersions were ready for testing.

EXAMPLES 2-10

Table I contains the results for nine different bisazo pigments prepared in imaging dispersions as described above and tested for electrophoretic migration image forming capability. It should be noted that the compounds of examples 4 and 6 did not form any discernible image and are not within the scope of this invention.

TABLE I

| Example | Substituted Groups in Formula I | | | Image Formed on Electrode 5 | |
|---|---|---|---|---|---|
| | $R^1$ | $R^2$ | $R^3$ | PEP | PIER |
| 2 | 4-OCH$_3$ | H | H | P-P | P-P |
| 3 | 2-OCH$_3$ | H | H | P-P | P-P |
| 4 | 2-OCH$_3$ | H | SO$_3$Na | * | * |
| 5 | 4-OC$_2$H$_5$ | H | H | P-P | * |
| 6 | 4-OC$_3$H$_7$ | H | H | * | * |
| 7 | 4-OCH$_3$ | H | 6-SO$_2$NH$_2$ | * | P-P |
| 8 | 4-OCH$_2$CONH$_2$ | H | H | N-P | N-P |
| 9 | 4-OCH$_3$ | 2-NO$_2$ | H | N-P | N-P |
| 10 | 2-OCH$_3$ | 5-NO$_2$ | H | P-P | P-P |

*No discernible image.
P - Positive image sense.
N - Negative image sense.
X-X - Image sense of original - Image sense produced on electrode 5.

The invention has been described in detail with reference to certain preferred embodiments thereof, but it will be understood that variations and modifications can be effected within the spirit and scope of the invention.

We claim:

1. In an electrophoretic migration imaging process which comprises subjecting an electrically photosensitive colorant material positioned between at least two electrodes to an applied field and exposing said material to an image pattern of radiation to which the material is photosensitive, thereby obtaining image formation on at least one of said electrodes, the improvement which comprises using as at least a portion of said material a bisazo naphthalenediol pigment having the formula:

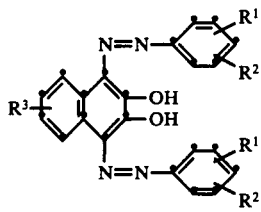

wherein:
$R^1$ is —OCH₃, —OC₂H₅ or —OCH₂CONH₂
$R^2$ is H or —NO₂; and
$R^3$ is H or —SO₂NH₂.

2. In an electrophoretic migration imaging process which comprises subjecting an electrically insulating carrier material positioned between at least two electrodes to an applied electric field and exposing said carrier material to an image pattern of radiation, said carrier material containing electrically photosensitive particles which comprise at least one colorant component photosensitive to said radiation, thereby obtaining image formation on at least one of said electrodes, the improvement which comprises using in at least a portion of said particles a bisazo naphthalenediol pigment having the formula:

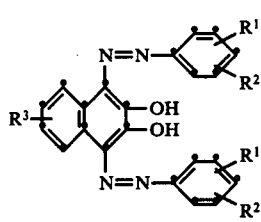

wherein:
$R^1$ is —OCH₃, —OC₂H₅ or —OCH₂CONH₂
$R^2$ is H or —NO₂; and
$R^3$ is H or —SO₂NH₂.

3. The process of claim 2 wherein $R_1$ is a methoxy group.

4. The process of claim 2 wherein the bisazo naphthalenediol pigment is selected from the group consisting of
1,4-bis(p-anisylazo0-2,3-naphthalenediol;
1,4-bis(o-anisylazo)-2,3-naphthalenediol;
1,4-bis(p-ethoxyphenylazo)-2,3-naphthalenediol;
1,4-bis(4-anisylazo)-2,3-dihydroxy-6-naphthalene sulfonamide;
1,4-bis(4-carbamoylmethoxyphenylazo)-2,3- naphthalenediol;
1,4-bis(2-nitro-4-anisylazo)-2,3-naphthalenediol; and
1,4-bis(5-nitro-2-anisylazo)-2,3-naphthalenediol.

5. In a multicolor electrophoretic migration imaging process which comprises subjecting an imaging dispersion positioned between at least two electrodes to an applied electric field and exposing said dispersion to an image pattern of activating rdiation, said dispersion containing an electrically insulating carrier liquid and a mixture of at least two differently colored, finely-dividedelectrically photosensitive particles, particles of one color being photosensitive to a different spectral range of said radiation than particles of a different color, at least some of said particles comprising at least one colorant component photosensitive to some portion of said radiation, thereby obtaining formation of a multicolor image on at least one of said electrodes, the improvement which comprises using in at least a portion of said particles a bisazo naphthalenediol pigment having the following formula:

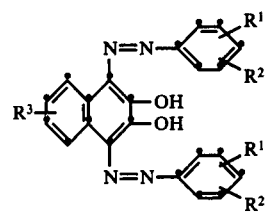

wherein:
$R^1$ is —OCH₃, —OC₂H₅ or —OCH₂CONH₂;
$R^2$ is H or —NO₂; and
$R^3$ is H or —SO₂NH₂.

6. The process of claim 5 wherein $R^1$ is a methoxy group.

7. The process of claim 5 wherein the bisazo naphthalenediol pigment is selected from the group consisting of
1,4bis(p-anisylazo)-2,3-naphthalenediol;
1,4-bis(o-anisylazo)-2,3-naphthalenediol;
1,4-bis(p-ethoxyphenylazo)-2,3-naphthalenediol;
1,4-bis(4-anisylazo)-2,3-dihydroxy-6-naphthalene sulfonamide;
1,4-bis(4-carbamoylmethoxyphenylazo)-2,3- naphthalenediol;
1,4-bis(2-nitro-4-anisylazo)-2,3-naphthalenediol; and
1,4-bis(5-nitro-2-anisylazo)-2,3-naphthalenediol.

* * * * *